United States Patent [19]
Watson

[11] 3,770,879
[45] Nov. 6, 1973

[54] ROTARY MECHANICAL TRANSLATING DEVICE

[76] Inventor: Thomas A. W. K. Watson, 2720 Goyer St., Apt. 24, Montreal, Quebec, Canada

[22] Filed: Dec. 3, 1970

[21] Appl. No.: 94,819

[52] U.S. Cl. ............................................... 74/682
[51] Int. Cl. ............................................ F16h 37/06
[58] Field of Search ................. 74/687, 682, 689, 74/675

[56] References Cited
UNITED STATES PATENTS

| | | | |
|---|---|---|---|
| 2,422,343 | 6/1947 | Duer | 74/685 X |
| 2,771,286 | 11/1956 | Clark, Jr. | 415/30 |
| 2,384,776 | 9/1945 | Trofimov | 74/689 |
| 2,665,596 | 1/1954 | Varble | 74/756 |
| 3,046,814 | 7/1962 | Soehrman | 74/689 |
| 3,299,741 | 1/1967 | Twiford | 74/682 |
| 3,318,172 | 5/1967 | Cummins | 74/682 |

*Primary Examiner*—C. J. Husar
*Attorney*—Thomas A. W. K. Watson

[57] ABSTRACT

A rotary mechanical translating device may be defined as a purely mechanical device which transfers power from a prime mover to a load as a magnified function of a displacement at its input connection. The device exhibits a power gain and may be employed to produce mechanical amplification. A change in angular velocity of its input will result in a change in the angular velocity of its output.

8 Claims, 8 Drawing Figures

Thomas A.W.K. Watson

Thomas A.W.K. Watson

Thomas A.W.K. Watson

ROTARY MECHANICAL TRANSLATING DEVICE

In its simplest form it comprises an input differential driving an output differential through a rotary unidirectional coupler or unidirectional rotary releaser or self locking rotary coupler. An input connection is attached to said input differential and an output connection is attached to said output differential. Both differentials are driven from a prime mover. The input differential's drive, to the output differential, and the drive from the prime mover, to the output differential, cancels each other. This results in no output, when the input is held stationary. Rotation of the input in the direction that reduces the input differential's drive, to the output differential, unbalances the system. This results in the device transferring power from the prime mover to the output connection.

The unidirectional coupler, which may take the form of a worm and worm gear, serves as a means against which the output differential may react, so as to develop output torque, and as a means of preventing said torque from appearing in the input. The output differential tends to drive the unidirectional coupler in the same direction that it is actually driven by the input differential. A modest amount of effort is required to rotate the unidirectional coupler in this direction, hence little effort is required to drive the input.

This disclosure relates to several rotary mechanical translating devices, all comprising systems of differentials, gears and other mechanical devices. Several systems are presented, each of which has different characteristics.

In one embodiment the spider of a first differential is driven by a prime mover and its first end gear is connected to the output shaft. It's second end gear is coupled to a first worm gear, which in turn mates with a first worm. The first end gear of a second differential drives said first worm. The spider of said second differential is also driven by the prime mover. The second end gear of said second differential is connected to a second worm gear which mates with a second worm. The first differential's spider is directly driven from the prime mover and it's second end gear is indirectly driven from the prime mover through the second differential. The ratio and direction of these two drives to the first differential is such that a balance occurs, resulting in zero rotation of the output shaft. This condition occurs when said second worm and worm gear are held stationary. When said second worm is rotated an unbalance occurs resulting in rotation of the output shaft.

This particular rotary mechanical translating device is unidirectional. It may be operated in the reverse direction by reversing the direction of the prime mover. In order to produce amplified bidirectional rotation at the output, a third differential's first end gear may be attached in a similar manner to the second worm and worm gear. It's spider should also be driven by the prime mover. The drive ratios are selected such that the second differential is over driven by the prime mover, the third differential is driven and drives the second differential so as to cancel its over drive. A third worm gear is attached to the second end gear of the third differential and co-operates with a third worm. The third worm acts as the input and it may be driven in either direction, producing rotation in the output in corresponding directions.

The second worm gear will always drive against the second worm which rotates in one direction only. This is the same direction as it is tended to be driven by the second worm gear. Little effort is then required to drive the second and third worm and the third differential. The system gain however will be more in the direction in which the third differential drives the third worm gear. When the third worm drives against the third worm gear, more effort is required. Amplification however occurs in both directions.

A balanced rotary mechanical translating device in which the input may drive the output with equal effort in both directions may be constructed from a system of four differentials and four worm and worm gears. In this arrangement the output differential derives its power from two other differentials which are driven from a prime mover. The fourth differential controls the system balance and is attached to the input connection.

Two or more of the above rotary mechanical translating devices may be cascaded to provide greater amplification. They may be employed to provide mechanical amplification and position control etc.

The primary objective is to provide a rotary mechanical translating device which uses only mechanical means to produce amplification. Another objective is to provide an improved means for controlling mechanical energy. Another objective is to provide a unidirectional rotary mechanical translating device. Still another objective is to provide a bidirectional rotary mechanical translating device. Another objective is to provide a means of coupling the rotary mechanical translating devices together so as to produce more amplification. Further objectives and advantages will become apparent in the following descriptions.

Figure 1:
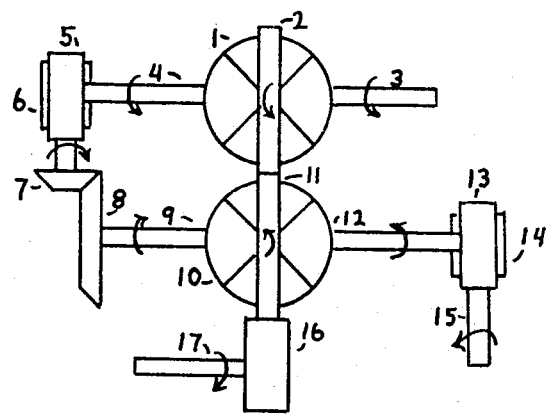
FIG. 1 is a schematic diagram of a unidirectional rotary mechanical translating device.

FIG. 1 shows differentials 1 and 10 with their spider gears 2 and 11 respectively meshed and driven by gear 16. Gear 16 is connected to shaft 17 which is driven by an external prime mover. One of the end gears of differential 1 is connected to the output shaft 3 and the other end gear is connected to shaft 4. Shaft 4 is connected to worm gear 5 which co-operates with worm 6, and in turn is connected to bevel gear 7. Bevel gear 8 meshes with gear 7 and is connected to shaft 9 which in turn is connected to one of the end gear's of differential 10. The other end gear of differential 10 is connected to shaft 12 to which is connected worm gear 13. Worm 14 co-operates with worm gear 13 and is connected to the input shaft 15.

The arrows show the relative direction of rotation of the shafts. Reversing the direction of rotation of the prime mover will reverse the direction of operation of the unidirectional rotary mechanical translating device.

When the input shaft 15 is not rotated it causes worm gear 13 to lock against worm 14, hence locking shaft 12. Shaft 9 is then driven by differential 10 at its maximum velocity driving gear 8 which drives gear 7 and in turn worm 6. Rotation of gear 6 causes rotation of gear 5, hence shaft 4. Shaft 4 is driven in the same direction and at the same velocity by worm gear 5, as it is driven by the end gear of differential 1 to which it is connected. This causes a balance condition to exist which results in zero rotation of the output shaft.

Rotation of the input shaft 15 in the direction shown results in worm 14 releasing worm gear 13. Gear 13 is driven against gear 14 and hence little effort is required to rotate the input shaft in the direction in which it is tended to be driven. The rotation of worm gear 13 in the direction shown allows shaft 12 to rotate resulting in the slowing down of shaft 9 as a consequence of differential action. This slows down shaft 4 and upsets the balance condition in differential 1 resulting in rotation of the output shaft 3.

When the input shaft 15 is rotated at a sufficiently high enough velocity to balance out the rotation of shaft 9, worm gear 5, worm 6 and shaft 4 stall. The output shaft 3 is then driven at full velocity by the prime mover through differential 1, as a result of the stalling of shaft 4, connected to one of its end gear's. Disconnecting worm 14 and allowing worm gear 13 to rotate freely would have the same effect.

Rotation of the output shaft 3 occurs only when the input shaft 15 is rotated. The prime mover supplies the power that drives the output shaft 3. Shaft 15 acts to control the speed at which the prime mover drives shaft 3. Since little effort is required to rotate the input shaft and the output shaft is driven by the prime mover, mechanical amplification results. Gear ratios may be selected to provide the required amount of rotation of the output shaft for given angular changes in the input shaft. The gear train comprising gears 5, 6, 7 and 8 have a combined ratio of unity, hence shaft 4 and 9 rotate at the same velocity. When there is no input to shaft 15, shaft 12 is held stationary and differentials 1 and 10 rotate shafts 4 and 9 respectively at twice the angular velocity of their driven spider gears.

Rotation of the input shaft backwards or at a speed greater than that required to stall shaft 4 will require considerable effort and is beyond the limit of the useful range of amplification of the device. In the case of bidirectional rotary mechanical translating devices, operation in the reverse direction will be satisfactory up to the speed which will develop a stalled condition within the unit.

The input worm and worm gears may be eliminated and the shaft 12 used as an input shaft provided that it is connected to a device which resists its free rotation. Little force is required to prevent the rotation of shaft 12.

The connections to the differentials may be interchanged provided the gear ratios are properly selected. A differential is a rotary differential means having three connections, each connection having interrelated and variable angular velocities with respect to each other. The terms first connection, second connection and third connection shall be used to designate these mechanical connections without regard to which part of the differential or differential means to which it is connected. Bevel gear and other types of differentials may be employed and the foregoing terminology shall still be applicable even though they do not necessarily have end gears and a spider. Worm gears could be replaced by other rotary undirectional couplers, often referred to as having self locking characteristics, such as twin worm gears.

Figure 2:
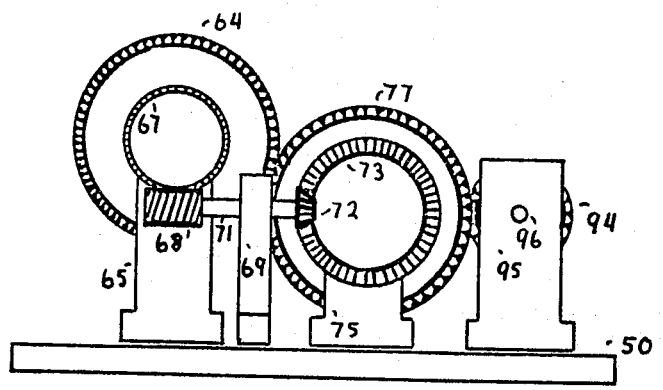
FIG. 2 is a side view of a unidirectional rotary mechanical translating device.
Figure 3:
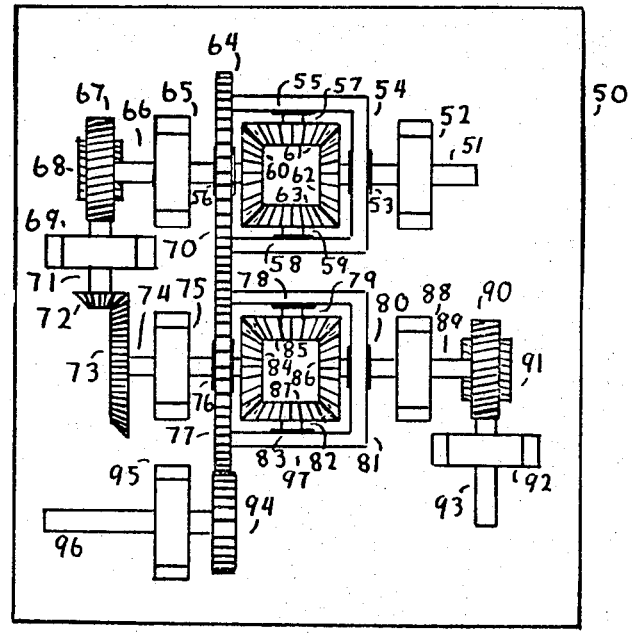
FIG. 3 is a plan view of the unit shown in FIG. 2.

FIGS. 2 and 3 show the construction of the rotary mechanical translating device depicted in the schematic diagram of FIG. 1. Bearing blocks 52, 65, 69, 75, 88, 92 and 95 are all mounted to base 50. An output shaft 51 runs in bearing 52 and bearing 53 mounted to housing 54 of the output differential 70. A bevel gear 62 is fastened to shaft 51 and meshes with bevel gear 61 and 63 mounted on stub axels 57 and 59 which rotates in bearings 55 and 58 respectively mounted in housing 54. A bevel gear 60 meshes with gears 61 and 63 and is fastened to shaft 66 which runs in bearing 56 mounted on the spider gear 64 and bearing 65. Housing 54 is attached to the spider gear 64. A worm gear 67 is fixed to shaft 66. A worm 68 on shaft 71 which rotates in bearing 69 meshes with worm gear 67. A bevel gear 72 is attached to shaft 71 and co-operates with bevel gear 73 on shaft 74. Shaft 74 runs in bearing 75 and bearing 76 mounted on spider gear 77 to which is mounted housing 81. A bevel gear 84 is fastened to shaft 74 and meshes with bevel gears 85 and 87 mounted on stub axels 79 and 82 which run in bearings 78 and 83 respectively. Bearings 78, 80 and 83 are mounted in housing 81. Bevel gear 86 meshes with gears 85 and 87 and is fastened to shaft 89 which runs in bearings 80 and 88. A worm gear 90 is fastened to shaft 89 and meshes with worm 91. Worm 91 is fixed to input shaft 93 which runs in bearing 92. A gear 94 is attached to the prime mover input shaft 96 which runs in bearing 95. Gear 94 drives spider gear 77 of the input differential 97 which in turn drives the spider gear 64.

An external prime mover applies power to the input shaft 96. The input shaft 93 controls the rotation of the output shaft 51 which derives its power from shaft 96.

Figure 4:
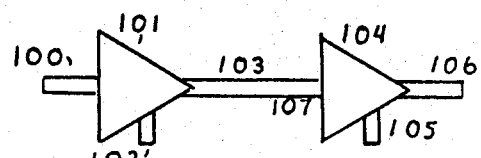
FIG. 4 is a schematic diagram of a two stage mechanical amplifier.

FIG. 4 shows a schematic diagram of two cascaded rotary mechanical translating device 101 and 104. A prime mover is connected to shaft 102 and 105 of rotary mechanical translating device 101 and 104 respectively. The output shaft 103 of rotary mechanical translating device 101 is connected to the input shaft 107 of rotary mechanical translating device 104. The input shaft 100 of rotary mechanical translating device 101 controls the output shaft 106 of the rotary mechanical translating device 104.

Figure 5:
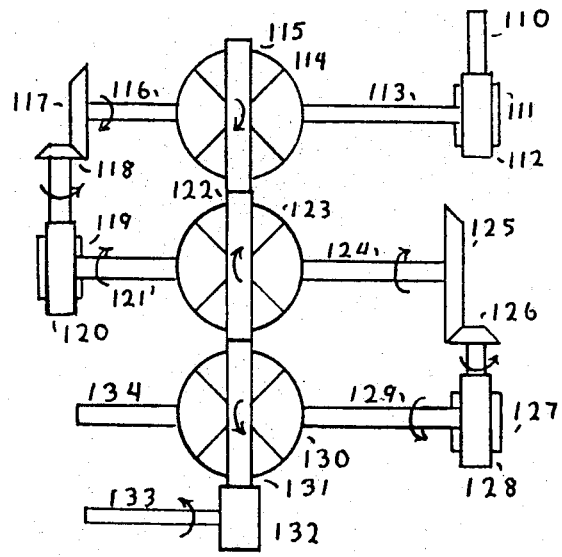
FIG. 5 is a schematic diagram of a bidirectional rotary mechanical translating device.

FIG. 5 shows a schematic diagram of a bidirectional rotary mechanical translating device, An input shaft 110 is coupled to worm 111 which meshes with a worm gear 112 on shaft 113. Shaft 113 is connected to an end gear of the input differential 114. The other end gear of differential 114 is connected to shaft 116 to which is fixed bevel gear 117 which meshes with bevel gear 118. Bevel gear 118 is coupled to worm 119 which meshes with worm gear 120 attached to shaft 121. Shaft 121 is connected to one of the end gear's of differential 123 whose other end gear is connected to shaft 124. A bevel gear 125 is attached to shaft 124 and meshes with bevel gear 126 which is coupled to worm 127. Worm gear 128 meshes with worm 127 and is fixed to shaft 129. Shaft 129 is coupled to one of the end gear's of the output differential 130. An output shaft 134 is connected to the other end gear of differential 130. Power is derived from an external prime mover connected to the power input shaft 133. Shaft 133 is fixed to gear 132 which meshes with the spider gear 131 of differential 130. Spider gear 131 also meshes with spider gear 122 on the intermediate differential 123 which in turn meshes with spider gear 115 on differential 114. The output differential 130 is driven by the prime mover and shaft 129. The speed and direction of the two drives to the differential 130 is such that a balance condition occurs resulting in zero rotation of the output shaft. The ratio of gears 125, 126, 127 and 128 is made greater than unity which will tend to overdrive shaft 129. However, the rotation of shaft 121 just compensates for this overdrive. Shaft 121 rotates at a speed controlled by the system comprising differential 114 and gears 117, 118, 119 and 120. The overall system gear ratios are selected to just balance out any rotation of the output shaft 134.

Rotation of the input shaft 110 in one direction decreases the speed of rotation of shaft 116. Rotation of the input shaft 110 in the opposite direction increases the speed of shaft 116. A limiting condition occurs when the input shaft 110 drives shaft 116 to a stall. A substantial amount of input drive will be required beyond this limit, as a result of the input power appearing in the output.

Another limiting condition occurs when the input shaft 110 drives shaft 124 to a stall. Throughout the useful range of amplification of the device, gear 120 rotates in the same direction being driven by the differential 123. Little effort is required to rotate worm 119 through out this range. The output shaft 134 rotates in one direction when shaft 129 rotates below the speed required to produce the balance and the output shaft rotates in the opposite direction when shaft 129 rotates faster than the speed required to produce the balance. Rotation of the input shaft 110 in either direction upsets this balance, resulting in amplification in both directions.

Figure 6:
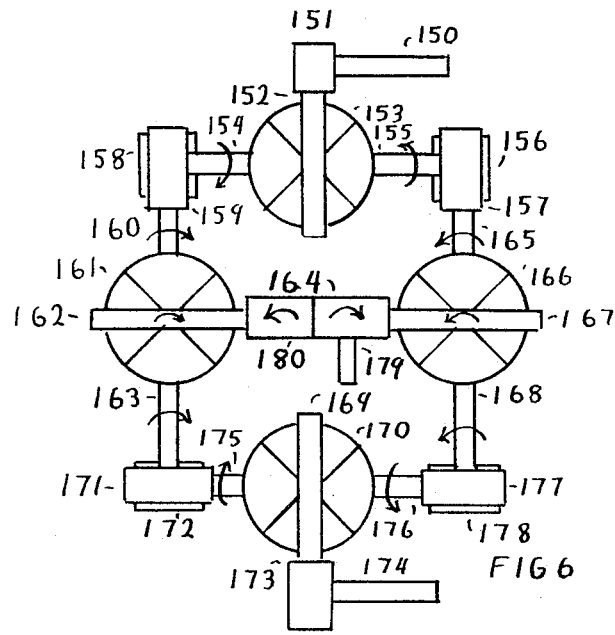
FIG. 6 is a schematic of a balanced bidirectional rotary mechanical translating device.

FIG. 6 shows a balanced bidirectional rotary mechanical translating device which requires equal input in both directions. An output shaft 150 is fixed to gear 151 which is driven by spider gear 152 of the output differential 153. Shafts 154 and 155 are connected to the worm gears 159 and 157 respectively and to the end gears of differential 153. Worms 158 and 156 are connected to shaft 160 and 165 and mesh with worm gears 159 and 157 respectively. Shafts 160 and 165 are connected to an end gear of differentials 161 and 166 respectively. Shafts 163 and 168 are coupled to the end gears of differentials 161 and 166 respectively. Worm gears 171 and 177 which are fixed to shafts 163 and 168 respectively, mesh with worms 172 and 178 respectively. Shafts 175 and 176 are fixed to worms 172 and 178 respectively, and are coupled to the end gears of the input differential 170. The spider gear 169 of differential 170 is driven by the gear 173 on the input shaft 174. The prime mover input shaft 179 is fixed to gear 164 which meshes with gear 180 and spider gear 167 of differential 166. Gear 180 meshes with the spider gear 162 of differential 161.

When the input shaft is stationary, shafts 163 and 168 remain stationary. Symetrical drive in opposite directions is applied to differentials 161 and 166 resulting in shafts 154 and 155 rotating with equal velocities in opposite directions. This results in a balance condition occurring in the differential 153. In order to rotate the output shaft this balance must be upset. Rotation of shaft 175 or 176 will produce an unbalance causing the output shaft to rotate. The differential 170 when rotated in one direction will activate shaft 175 and in the other direction, shaft 176. One shaft is difficult to rotate in one direction and the other in the opposite direction, the differential selects the shaft exhibiting the lease resistance to rotation.

The device is symetrical, therefore the sense of unbalance determines the direction of rotation of the output. Limiting conditions occur when shafts 160 and 165 are driven to a stall by the input.

Figure 7:
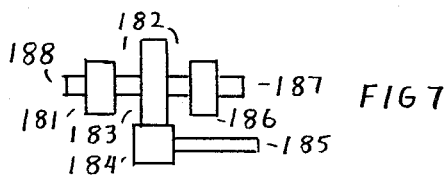
FIG. 7 is a schematic diagram of an alternate input for the balanced rotary mechanical translating device.

FIG. 7 shows an alternate input arrangement. An input shaft 185 is fixed to a gear 184 which drives gear 183 attached to shaft 182. Shafts 188 and 187 are attached to ratchets 181 and 186 respectively, which in turn are fixed to shaft 182. Rotation of shaft 182 in one direction engages ratchet 181, which results in the rotation of shaft 188. Rotation of shaft 182 in the opposite direction results in the engaging of ratchet 186, thus causing rotation of shaft 187. Shafts 188 and 187 may be coupled to worms 172 and 178 of FIG. 6 eliminating the need of the input differential 170.

Figure 8:
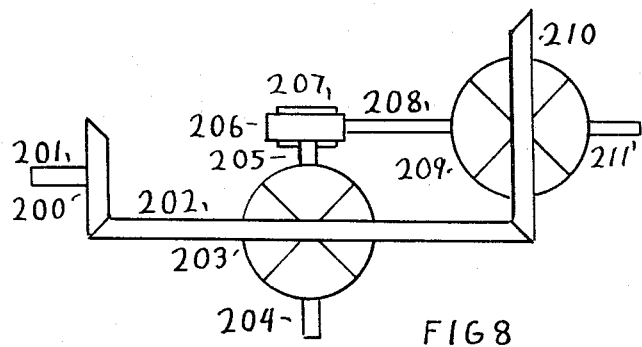
FIG. 8 is a schematic diagram of the rotary mechanical translating device in its simplest form.

FIG. 8 shows the rotary mechanical translating device in a very simple form, comprising a power input shaft or connection 201, fixed to a bevel gear 200 which meshes with spider gear 202 of the output differential 203. An output shaft or connection 204 is joined to differential 203. A shaft 205 also extends from differential 203 and is fixed to a worm gear 206 meshed with a worm 207. Worm 207 is fixed to shaft 208 which is connected to one of the end gear's of the input differential 209. The other end gear of differential 209 is connected to the input shaft or connection 211. The spider gear 210 of the input differential 209 is meshed with spider gear 202 of differential 203.

The operation of this device is similar to that given for FIG. 1. No input worm and worm gear are shown since it is not required, when the input shaft is prevented from freely rotating. The bevel gears 7, 8, 72, 73, 117 and 118 in FIGS. 1, 3 and 5 may be eliminated in other variations of the device, as they are not fundamental to its operation.

Normally a single prime mover would be connected to the translating device, however it is possible to connect separate prime movers, although not preferable, to each differential requiring power.

In the case of the rotary unidirectional rotary releasers or self locking rotary couplers, the input refers to the connection of the device which accepts power and the output connection refers to the connection which delivers power. In all these devices the output shaft or connection cannot be rotated unless the input shaft is rotated, hence they have a rotary releasing action, in as much as the rotation of the input releases a rotary moment of force applied to the output. Also the output locks against the input, exhibiting a self locking characteristic. In the worm and worm gear combination the worm acts as the input and the worm gear the output. The worm gear is not capable of driving the worm but the worm is capable of driving the worm gear. In operation in a rotary translating device the worm acts to release the worm gear.

A twin worm gear comprises two meshed helical screws. One helical screw has a fine pitch and the other a course pitch wound in the opposite direction. Since each screw has a different lead angle, they do not have parallel shafts, hence they may be used in conjunction with bevel or helical gears, in order to make their shafts parallel. It has a self locking characteristic similar to that of a worm and worm gear, it will also act to provide a releasing action.

The translating device as shown in FIG. 8 is basic to all forms of the device. It is basic to the devices shown in FIGS. 1, 2, 3, 5 and 6. In the case of FIG. 6 the drive to differential 153 is obtained through one of the worm gears which supplies power to it from a prime mover. The other worm and worm gear acts as a unidirectional coupler. Since the system is symmetrical the worm and worm gear through which input rotation is transmitted, is to be considered as the one that acts as a unidirectional coupler.

It is also not necessary to completely balance any of the translating devices. When a prime mover drives the device's power input connection, it could develop an output on its power output connection, even though its control input connection is not rotated. When the input is rotated it would change the speed of the output.

The foregoing disclosure is illustrative and it is understood that changes may be made to the embodiments contained herein without departing from the scope and spirit of this invention.

I claim:

1. A rotary mechanical translating device comprising a first and a second differential each having a first, a second and a third connection means, a self locking rotary coupler having an output connection means connected to the first connection means of the first differential, and said self locking rotary coupler having an input connection means connected to the first connection means of the second differential.

2. A rotary mechanical translating device as claimed in claim 1, comprising a second self locking rotary coupler having an output connection means connected to the third connection means of the second differential.

3. A mechanical amplifier comprising a first and a second differential each having a first, a second, and a third connection means, a self locking rotary coupler having an output connection means connected to the first connection means of the first differential, said self locking rotary coupler having an input connection means connected to the first connection means of the second differential, the second connection means of the first and second differentials connected to a prime mover, the third connection means of the first differential connected to a load, and the third connection means of the second differential connected to an input control means.

4. A rotary mechanical translating device comprising a first, and a second self locking rotary coupler each having an input and an output connection means, a first differential connected to the output connection means of the first self locking rotary coupler, a second differential connected between the input connection means of the first self locking rotary coupler and the output connection means of the second self locking rotary coupler, and a third differential connected to the input connection means of the second self locking rotary coupler.

5. A rotary mechanical translating device as claimed in claim 4, comprising a third self locking rotary coupler having an input and an output connection means, in which the third differential is connected between the output connection means of the third self locking rotary coupler and the input connection means of the second self locking rotary coupler.

6. A rotary mechanical translating device comprising a first, a second, a third and a fourth self locking rotary coupler each having an input and an output connection means, a first differential connected between the output connection means of the first and fourth self locking rotary couplers, a second differential connected between the input connection means of the first self locking rotary coupler and the output connection means of the second self locking rotary coupler, and a third differential connected between the output connection means of the third self locking rotary coupler and the input connection means of the fourth self locking rotary coupler.

7. A rotary mechanical translating device as claimed in claim 6, comprising a fourth differential connected between the input connection means of the second and third self locking rotary couplers.

8. A rotary mechanical translating device as claimed in claim 6, comprising a first and a second ratchet each having an input connection means connected to each other; the first ratchet having an output connection means connected to the input connection means of the second self locking rotary coupler, the second ratchet poled for engagement in the opposite direction to the first ratchet and having an output connection means connected to the input connection means of the third self locking rotary coupler.

* * * * *